US011481329B1

(12) United States Patent
Meister

(10) Patent No.: US 11,481,329 B1
(45) Date of Patent: Oct. 25, 2022

(54) OPTIMIZING MEMORY BANDWIDTH IN SPATIAL ARCHITECTURES

(71) Applicant: Reservoir Labs, Inc., New York, NY (US)

(72) Inventor: Benoit J. Meister, New York, NY (US)

(73) Assignee: Reservoir Labs, Inc., San Diego, CA (US)

( * ) Notice: Subject to any disclaimer, the term of this patent is extended or adjusted under 35 U.S.C. 154(b) by 272 days.

(21) Appl. No.: 16/929,859

(22) Filed: Jul. 15, 2020

Related U.S. Application Data

(60) Provisional application No. 62/874,189, filed on Jul. 15, 2019.

(51) Int. Cl.
| | |
|---|---|
| *G06F 12/00* | (2006.01) |
| *G06F 13/00* | (2006.01) |
| *G06F 13/28* | (2006.01) |
| *G06F 12/084* | (2016.01) |
| *G06F 8/36* | (2018.01) |
| *G06F 8/41* | (2018.01) |
| *G06F 9/50* | (2006.01) |

(52) U.S. Cl.
CPC .............. *G06F 12/084* (2013.01); *G06F 8/36* (2013.01); *G06F 8/452* (2013.01); *G06F 9/5016* (2013.01)

(58) Field of Classification Search
CPC .............................. G06F 9/5016; G06F 12/084
USPC ........................................................... 711/147
See application file for complete search history.

(56) References Cited

U.S. PATENT DOCUMENTS

| | | | | |
|---|---|---|---|---|
| 2006/0031652 | A1* | 2/2006 | Richter | ................... G06F 8/445 711/165 |
| 2016/0147514 | A1* | 5/2016 | Baskaran | .............. G06F 8/4434 717/150 |
| 2019/0012269 | A1* | 1/2019 | Bubb | ...................... G06F 9/546 |
| 2019/0303311 | A1* | 10/2019 | Bilski | ................. G06F 13/4022 |

* cited by examiner

*Primary Examiner* — Edward J Dudek, Jr.
*Assistant Examiner* — Sidney Li
(74) *Attorney, Agent, or Firm* — Seyfarth Shaw LLP

(57) ABSTRACT

A technique to facilitate efficient, parallelized execution of a program using a multiprocessor system having two or more processors includes detecting and, optionally, minimizing broadcast data communication between a shared memory and two or more processors. To this end, the broadcast space of a data structure is generated as an intersection of the reuse space of the data structure and the placement space of a statement accessing the data structure. A non-empty broadcast space implies broadcast data communication that can be minimized by rescheduling the statement accessing the data structure.

20 Claims, 4 Drawing Sheets

OPTIMIZING MEMORY BANDWIDTH IN SPATIAL ARCHITECTURES

CROSS-REFERENCE TO RELATED APPLICATIONS

This application claims priority to and benefit of U.S. Provisional Patent Application No. 62/874,189, entitled "Systems and Methods for Trading Off Latency for Memory Bandwidth in Spatial Architectures using the Polyhedral Model," filed on Jul. 15, 2019, the entire contents of which are incorporated herein by reference.

FIELD OF THE INVENTION

This disclosure generally relates to techniques for scheduling for execution the operations specified in a source program and, in particular, to scheduling such operations for parallelized execution using two or more processors or processor cores.

BACKGROUND

In general, a source program can be considered a sequence of programming statements written in a particular programming language such as C, C++, JAVA, SCALA, R, Python, TensorFlow (TF), etc. The source program (simply "program," hereinafter) is compiled by a compiler to obtain an executable that can be executed to perform the operations specified in the program. One important task of a compiler is to perform scheduling. Scheduling, in itself, involves many tasks but, at a minimum, scheduling can be understood as generating a sequence of operations from the given program. When the target computing system, i.e., a computing system used for the execution of the compiled program, includes several processors or processing cores (referred to as "processors," "processing elements," or "PE" in the discussion below), a respective sequence of operations may be generated for each processing unit.

The sequence of operations generated by a compiler must not violate the logic represented by the specified program. For example, consider two statements: "S1: x=a+b; S2: y=x−c;" If specified in that order in the program, it follows that the addition operation must be performed and completed before the subtraction operation. Moreover, a memory-write operation storing the result of the addition operation at a memory location assigned to the variable "x" must be completed before a memory-read operation retrieving the value of "x" is initiated.

The memory-access operations involving "x" and, as a consequence, the statements S1 and S2, are thus understood as having a dependence relation. In this case, the dependence is read-after-write; other types of dependences include write-after-read and write-after-write. The task of generating a sequence of operations must not violate any of the dependences implied by the program. Not all operations/statements have a dependence relation, however. For example, another memory-read operation, to retrieve the value of the variable "c" may be completed before or after the memory-write and memory-read operations with respect to "x."

The above-described task involved in scheduling, i.e., deriving a valid sequence of operations, including arithmetic, logical, and memory access (read and write) operations, becomes increasingly complex when the variables involved are non-scalars, i.e., vectors (one-dimensional data structures or arrays), matrices (two-dimensional data structures), or tensors (three or more dimensional data structures). This is in part because the statements that specify operations involving such variables are often included with a loop or a loop nest (an outermost loop that includes one or more inner loops), to access systematically the different portions of the data structure in different dimension and, as such, the specified operations must be performed not just once, but several times (e.g., tens, hundreds, or even millions of times). The dependences between several iterations of different operations must be analyzed and must not be violated during scheduling, making the scheduling task complex.

Scheduling becomes even more complex when the program is to be executed using not just a single processor/core but using several (e.g., 2, 8, 32, 1024, or even more) processors of a multi-processor runtime environment. With more than one processors available, a scheduler performing the task of scheduling must not only identify and obey the dependences among various operations, but must also identify operations that are not dependent on one another, and schedule them for parallel execution using the available processors. This can increase the utilization of the available multi-processor runtime environment, and can speed-up the execution of the program. The scheduler may also need to account for other objectives such as, e.g., maintaining memory locality so that excessive thrashing of one or more cache memories does not occur.

To extract parallelism while also achieving other objectives, a scheduler often performs various optimizations, e.g., by applying one or more transforms to a loop or a loop nest, such as loop fusion, loop fission, loop permutation, loop reversal, loop skewing, loop tiling, etc. The benefit of each candidate transform, e.g., in terms of improved parallelism, is weighted against a potential penalty, e.g., in terms of decreased memory locality/cache thrashing, increased data communication, etc. Given the already complex nature of the scheduling task, the evaluation and exploration of many different optimizations and transforms can make the scheduling task excessively complex, i.e., the processor performing scheduling can run out of available memory or the memory allocated for the scheduling task. Alternatively, or in addition, the processor may not be able to perform scheduling within a specified or allocated time, such as a few minutes, a few hours, or even a few days. Indeed, the general problem of scheduling is commonly considered to be intractable. Polyhedral scheduling is often employed for performing tradeoffs between parallelization, memory locality, and data communications.

SUMMARY

Parallelization, whether performed using a polyhedral schedular or otherwise, can sometime increase the cost of data communication. Consider, for example, the computation "cos (A+B)=cos (A) cos (B)−sin (A) sin (B)" using two processors, P1 and P2, where P1 is specialized for cosine computation and P2 is specialized for sine computation. According to one schedule, in step 1, P1 may be tasked with computing cos (A) and P2 may be tasked with computing sin (A). In step 2, P1 may compute cos (B) and P2 may compute sin (B). In step 3, P1 may compute the product cos (A) cos (B), and P2 may compute the product sin (A) sin (B). In the last step 4, P1 (or P2), may compute the difference and provide the final result. In this schedule, it is necessary to transmit both of the values A and B from a shared memory, e.g., a main memory, to both of the processors P1 and P2.

Now consider a modified schedule, where P2 is tasked with computing sin (B) in step 1 and sin (A) in step 2. P2 can still compute the product sin (A) sin (B) in step 3, and the final result would still be available in step 4. In this modified schedule, it is necessary to transmit from the shared/main memory, at the beginning of step 1, only the value A to processor P1, and only the value B to processor P2. Thereafter, at the beginning of step 2, processor P1 can provide the value A to processor P2, and processor P2 can provide the value B to processor P1. The total number of steps required to perform the overall computation has not changed per the new schedule, and the utilization of the two processors has also not changed. Data communication from the shared/main memory to the processors has reduced, however, and is replaced by inter-processor communication. To the extent the architecture of the computing system allows such inter-processor communication, if the inter-processors communication is less costly, e.g., in terms of adverse impact on other communications between the shared memory and the processor(s), power/energy consumption etc., and/or is faster, than the communication between the shared memory and the processors, the modified schedule can improve the operation of the multi-processor system, e.g., by minimizing power consumption, overall memory access bandwidth, overall computation time, etc., without adversely affecting parallelization of the computation.

Optimizations such as that described above can be particularly challenging when the values accessed are not scalars, but are complex data structure(s) having one or more dimensions, and where such data structure(s) are accessed from statement(s) within loop nests, where the statement(s) are iteratively executed several (e.g., tens, hundreds, thousands, millions, or more) times and, in some iterations the same elements of the data structure(s) are accessed while in other iterations different elements of the data structure(s) are accessed. If the operations represented by the statements can be scheduled such that broadcasting of data element(s), i.e., communication of the same data element(s) to different processors is minimized without minimizing parallelization of the operations, the functioning of the multi-processing system can be improved.

To this end, various embodiments described herein feature detection of broadcast of one or more data elements of one or more data structures accessed within a program. Based on the detected broadcast, the program may be modified to minimize or avoid such broadcast. In addition to detecting broadcast, some embodiments also feature minimization of the broadcast of one or more data elements of one or more data structures, so as to improve the functioning of a multi-processor system used to execute the program.

Accordingly, in one aspect a method is provided for optimizing communication between a shared memory and several processors. The method includes selecting by a computing unit, during compilation of a program, a first statement in the program. The program includes a loop nest having a set of loop dimensions, and the loop nest includes the first statement, which accesses a first data structure in various iterations of the first statement. The selection is made during compilation of the program, which after compilation, is to be executed using the several processors.

The method also includes obtaining a placement space of the iterations of the first statement, across the several processors. The placement space may be defined in terms of one or more of the set of loop dimensions of the loop nest. The method further includes determining a reuse space of the first data structure across the iterations of the first statement, where the reuse space is defined in terms of a subset of the set of loop dimensions. The subset can be the same as the set of loop dimensions.

In addition, the method includes deriving a broadcast space of the first data structure via an intersection of the placement space and the reuse space. A non-empty broadcast space indicates that one or more elements of the first data structure are accessed by two or more of the several processors, requiring communication of those one or more elements between a shared memory and each of the two or more processors.

In some embodiments, the method further includes determining that the broadcast space of the first data structure is empty, which facilitates access to one or more elements of the first data structure by a second processor of the several processors directly from a first processor of the several processors, without the second processor having to access the shared memory to access the one or more elements of the first data structure.

The reuse space of the first data structure may be represented in a constraint form, and determining the reuse space may include: identifying a loop dimension such that for different values of a loop index corresponding to the identified loop dimension, different elements of the first data structure are accessed. The method also includes defining the reuse space, at least in part, by an equality setting the identified loop dimension to zero. For example, if the loop dimensions are "i," "j," and "k,", one equality can be "i=0;" another equality can be "k=0;" and the reuse space may be specified as: $R_A$=i=0; k=0

In some embodiments, the reuse space of the first data structure is represented in a constraint form (as described above), and determining the reuse space includes selecting from the set of loop dimensions (e.g., i, j, k, for a loop nest of three loop dimensions), a group of loop dimensions where, for each loop dimension in the group, accessing elements of the first data structure is independent of a loop index corresponding to that loop dimension. For example, suppose a three-dimensional loop nest is "i, j, k," having dimensions "i," "j," and "k," and corresponding loop index variables "i," "j," and "k," as well. If in the innermost loop corresponding to the dimension "k," a data structure is accessed using loop indices "j" and "k" only, but not the loop index "i," the group of loop dimensions would be i.

The method further includes defining the reuse space as a set of equalities where, for each loop dimension in the set of loop dimensions that is not in the group of loop dimensions, (e.g., $\{i, j, k\}\setminus\{i\}=\{j, k\}$) the set of equalities includes an equality setting that loop dimension to zero, e.g., $\{j=0; k=0\}$.

In some embodiments, the intersection of the placement space and the reuse space includes a conjunction of: (i) one or more constraints representing the placement space and (ii) one or more constraints representing the reuse space. Alternatively or in addition, the intersection of the placement space and the reuse space may include concatenation of: (i) one or more normals to one or more hyperplanes defined by one or more equalities of the reuse space and (ii) one or more normals to one or more hyperplanes defined by one or more equalities of the placement space.

In some embodiments, the broadcast space of the first data structure is defined as a set of constraint equalities setting one or more loop dimensions from the set of loop dimensions to zero, and the method further includes determining as a broadcast loop dimension of the first data structure, a loop dimension from the set of loop dimensions excluded from the one or more loop dimensions from the set of constraint equalities. Alternatively or in addition, in some embodiments, the broadcast space of the first data structure is defined as a set of normals corresponding to one or more loop dimensions from the set of loop dimensions, and the method further includes determining as a broadcast loop dimension of the first data structure, a loop dimension from the set of loop dimensions excluded from the set of normals.

In some embodiments, the method further includes reducing a number of loop dimensions of the broadcast space of the first data structure for minimization of the communication of the one or more elements of the first data structure between the shared memory and each of the two or more processors. Reducing the number of loop dimensions of the broadcast space may include generating an iteration transformation space, denoted V, based on one or more loop dimensions from the set of loop dimensions that are independent of the broadcast space of the first data structure. The method also includes selecting a loop dimension corresponding to one or more normals to one or more hyperplanes defined by one or more equalities of the reuse space. In addition, the method includes determining that the selected loop dimension is dependent from the placement space, and modifying the selected loop dimension using a loop dimension from the iteration transformation space.

The first statement or a second statement within the loop nest may access a second data structure in iterations of the first or the second statement. The method may include performing the selecting, obtaining, determining, deriving, and the reducing step for the second data structure.

In another aspect, a system is provided for optimizing communication between a shared memory and several processing elements (PEs). The system includes a first processor, and a first memory in electrical communication with the first processor. The first memory includes instructions that, when executed by a processing unit that includes the first processor or a second processor, and that is in electronic communication with a memory module that includes the first memory or a second memory, program the processing unit to select, during compilation of a program, a first statement in the program. The program includes a loop nest having a set of loop dimensions, and the loop nest includes the first statement, which accesses a first data structure in various iterations of the first statement. After the compilation of the program, it is to be executed using the several PEs.

The instructions also program the processing unit to obtain a placement space of the iterations of the first statement, across the several PEs. The placement space may be defined in terms of one or more of the set of loop dimensions of the loop nest. The instructions further program the processing unit to determine a reuse space of the first data structure across the iterations of the first statement, where the reuse space is defined in terms of a subset of the set of loop dimensions. The subset can be the same as the set of loop dimensions.

In addition, the instructions program the processing unit to derive a broadcast space of the first data structure via an intersection of the placement space and the reuse space. A non-empty broadcast space indicates that one or more elements of the first data structure are accessed by two or more of the several PEs, requiring communication of those one or more elements between a shared memory and each of the two or more PEs. In various embodiments, the instructions can program the processing unit to perform one or more of the method steps described above.

BRIEF DESCRIPTION OF THE DRAWINGS

The present disclosure will become more apparent in view of the attached drawings and accompanying detailed description. The embodiments depicted therein are provided by way of example, not by way of limitation, wherein like reference numerals/labels generally refer to the same or similar elements. In different drawings, the same or similar elements may be referenced using different reference numerals/labels, however. The drawings are not necessarily to scale, emphasis instead being placed upon illustrating aspects of the invention. In the drawings.

DETAILED DESCRIPTION

We present a fast algorithm for transforming loop nests represented in the polyhedral model, which have been placed onto a spatial grid of processors. The goal of the transformation is to avoid broadcasts, which can put extra pressure on remote memory bandwidth, and turn them mainly into neighbor-to-neighbor reuse. The transformation preserves existing parallelism and locality properties of the original program as much as possible, and in particular does not reduce its amount of parallelism.

1 Introduction

Some computer architectures—often called spatial architectures—are based on a grid of processing elements (PEs) that have the ability to transfer data to and from PEs that are physically close to them. These PEs are called neighbors to the PE under consideration. PEs can typically transfer data from remote memories, for which there is a limited bandwidth. In highly parallel systems, in which there are many PEs in the PE grid, there is a significant risk of saturating the bandwidth to remote memories.

Saturating the bandwidth results in a reduction of both program performance (i.e., increase of runtime) and performance predictability. When data is being reused across PEs, there is an opportunity to reduce the amount of data transfers from/to remote memories by turning several simultaneous loads/stores of the reused data from the remote memory into a small number of loads/stores (typically one or only a few) from/to remote memory, followed by (or preceeding) a series of neighbor-to-neighbor transfers. Here we present a technique to automatically re-schedule operations such that the neighbor-to-neighbor transfers can occur. We model the multiple loads/stores from remote memory to PEs as a broadcast, i.e., a (roughly) simultaneous use of the reuse data across a set of PEs.

In various embodiments, our method can turn such simultaneous use of reused data into consecutive uses of the data by neighbors, the neighbors of these neighbors, etc. When data is used consecutively among neighbors, the data can be transferred (between the consecutive uses) directly between neighbors, as opposed to being brought in repeatedly from the remote memory. Our technique achieves this, in part, by: (1) identifying broadcasts, for each data set accessed within a loop (or loop nest) in a program, as a linear subspace of the PE grid, called broadcast space; (2) modifying the time at which PEs access the reused data in such a way that PEs in the broadcast space access the reused data in sequence, where they originally accessed the data in parallel; and (3)

organizing the sequence such that neighboring PEs access the reused data consecutively or sequentially.

Figure 1:
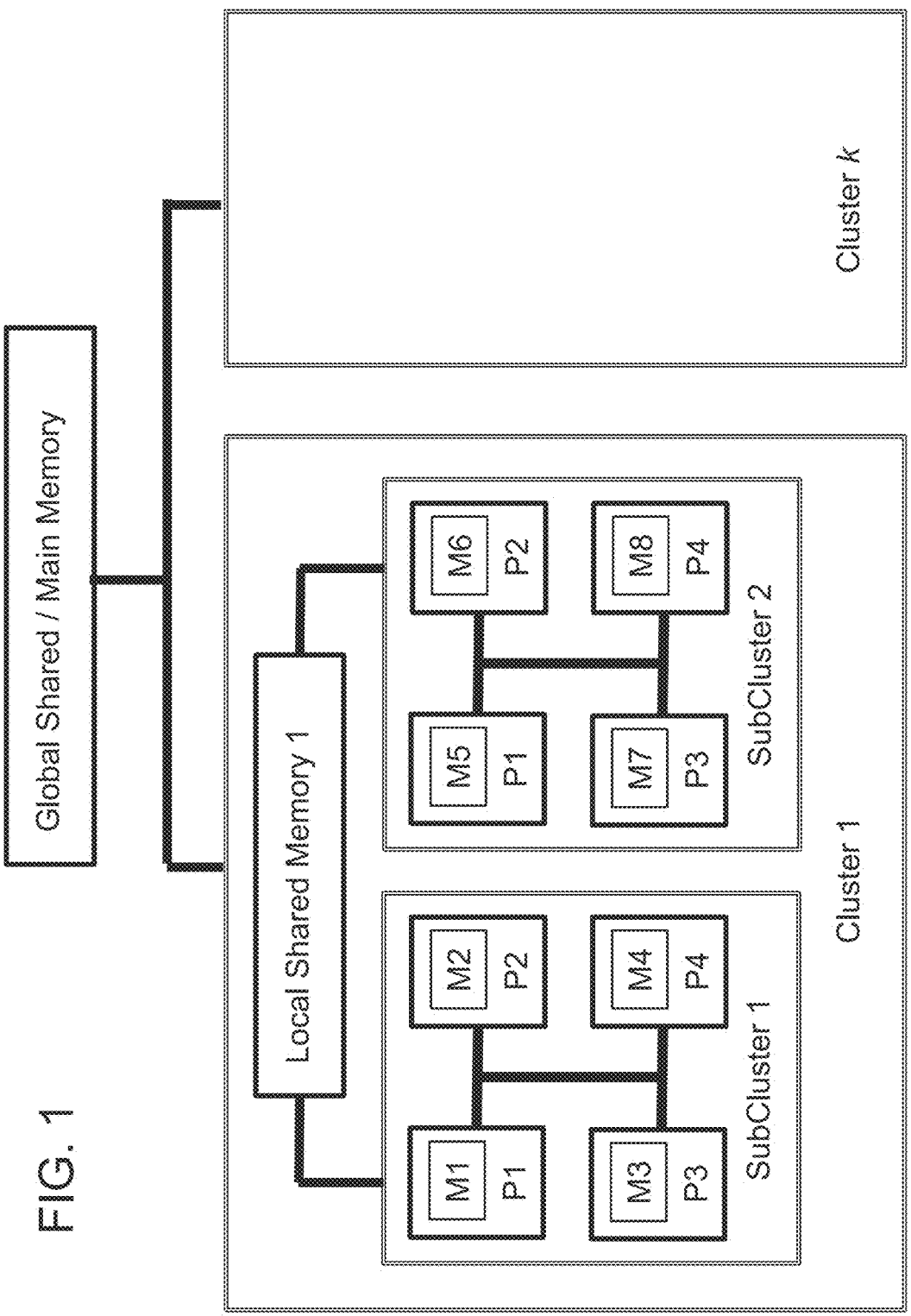
FIG. 1 schematically depicts a multi-processor computing system.

A typical multi-processor computing environment/system in which various embodiments described herein can minimize data communication between a global (also referred to a main) shared memory and one or more processing elements (PEs), is shown in FIG. 1. In particular, each of the PEs P1-P4 includes a dedicated processor memory, shown as M1-M4, respectively. The PEs P1-P4 form a subcluster in which all the four PEs can exchange data with one another, i.e., they are all "neighbors" of each other. Two or more subclusters form a cluster, which includes a local shared memory. The processor(s) in one subcluster of a cluster may exchange data with the processor(s) in another subcluster of the cluster via the local shared memory. The multi-processing system may include one or more clusters. The processors in different clusters may exchange data with one another via the global shared memory (also called the main shared memory or main memory).

It should be understood that the architecture shown in FIG. 1 is illustrative only. In general, a subcluster may include less than or more than 4 PEs. Different subclusters may include the same number of PEs or different number of PEs. Some architectures may feature additional levels of hierarchies, with a shared memory at each level. In some architectures, a local shared memory is not provided. In these architectures, some PEs in a respective group/cluster may exchange data with one another, and with PEs in another group/cluster via the global shared memory. The PEs can be arranged as neighbors using many different network topologies.

2 Principle

2.1 Broadcast space

Operations in the polyhedral model are represented by statements, to each of which is associated an iteration domain. Iterations are mapped to processors through a placement function.

Let f be a $\mathbb{Q}^n \to \mathbb{Q}^m$ linear function. Let us consider a reference $X[f(I)+f_0(N)]$ to m-dimensional array X (a data structure, in general), in a nested loop, where $I \in \mathbb{Q}^n$ represents the set of loop counters and $N \in \mathbb{Q}^p$ is an affine (i.e., linear plus a constant) function of loop-invariant expressions (typically referred to as "parameters").

$X[f(I)+f_0(N)]$ results in a broadcast if and only if a given element of X is used by a subspace of the processors at the same time. When looking at loop programs, the notion of time generally maps to loop iterations. Iterations that contribute to a broadcast use the same element of X through f (i.e., they belong to f's reuse space) across a subspace of the processor grid at a fixed time. The placement space represents iterations that are mapped to different processors in the grid at a given time.

Let Pl(I) be the placement function associated with a polyhedral operation. A placement function, which is typically multidimensional, defines a mapping between any given loop iteration of a statement and the coordinates of the PE in the PE grid that will execute that iteration. The placement function usually has one dimension (i.e., one function) per dimension of the PE grid.

Mathematically, the spaces above are defined as follows. Let D be the iteration domain associated with an array reference f·f's reuse space R(f) is defined as the iterations that use the same element of X in D:

$$R(f) = Ker(f) \cap D$$

where Ker(f) is the kernel of f, i.e., the iterations space $\{I \in \mathbb{Q}^n : fI=0\}$. The analysis we present here relies on subspaces, and hence we can retain only the equalities E of D in the definition of the reuse space:

$$R(f) = Ker(f) \cap E \quad (1)$$

A polyhedral operation's placement space is defined as iterations that map to different processors for a given time:

$$P(Pl) = \text{Span}(Pl)$$

A more general definition of the placement space can be considered. We may want to avoid broadcasts only along a given dimension of the processor grid, in which case we may look at the span of the corresponding rows of Pl.

The broadcast space is the subspace of iterations reusing the same element of X across processors, i.e., the intersection of R(f) and P(Pl).

$$B(f,Pl) = Ker(f) \cap \text{Span}(Pl) \cap D$$

2.2 Transformation

A goal of broadcast elimination is to reduce the dimensionality of the broadcast spaces (one space per data-structure reference). As discussed herein, this can be done by combining time dimensions into the placement dimensions. We define these terms and describes a family of techniques to detect automatically and remove certain memory access patterns that can lead to broadcasts.

An underlying idea is to find a time vector that is independent of the broadcast space, and combine a vector of the placement space with it. The method may automatically select a vector of the reuse space that is independent from the placement space, which will also (by definition of the broadcast space) be independent from the broadcast space, and select appropriate vector of the placement space, which is then combined with the selected vector of the reuse space.

We will use the following matrix multiply loop nest as our running example.

Example 1 for i= . . . .
  for j= . . . .
    for k= . . . .

$C[i][j] += A[i][k]*B[k][j];$

Here, the loop nest includes three loops and, thus, has three dimensions. These dimensions can be referred to as 1, 2, 3; or 0, 1, 2; or 2, 1, 0; or simply "i," "j," and "k." A loop index corresponds to each loop dimension, where the range of the loop index defines the number of iterations of the corresponding loop. In Example 1, the loop indices are "i," "j," and "k," corresponding to dimensions "i," "j," and "k," respectively. The loop nest of Example 1 includes one statement that accesses three data structures, namely, A, B, and C. The placement function is Pl=(i, j), i.e., the processors are arranged in a two dimensional grid defined by two of the three loop dimensions "i" and "j."

It should be understood that a loop nest of three dimensions and a processor grid of two dimensions is described merely for the sake of simplicity. In general, a loop nest can have any number of dimensions, e.g., 1, 4, 8, 15, etc., and, likewise, the processor grid can also have any number of dimensions, e.g., 1, 3, 8, etc. It should also be understood that while the loop nest of Example 1 includes only one statement and only accesses three two-dimensional data structures (matrices), in general, a loop nest may include any number (e.g., 1, 3, 10, etc.) of statements. Similarly, a statement in a loop nest may access fewer than or more than three data structures, where the data structures may include one, two, three, or more dimensional data structures. Moreover, different statements in a loop nest may access entirely different data structures, all the same data structures, or one or more of the same data structures and one or more different data structures.

In Example 1, the Placement space is the span of i and j, i.e. in constraints form:

$P=\{k=0\}$

Reuse spaces are:

$R_C=\{i=0;j=0\}$ $R_A=\{i=0;k=0\}$ $R_B=\{j=0;k=0\}$

Hence, the broadcast spaces are:

$B_C=\{0\}$ $B_A=\{i=0;k=0\}$ $B_B=\{j=0;k=0\}$

Thus, $B_A$ is a line along the loop dimension j, and $B_B$ a line along the loop dimension i, which means that A is broadcast along j and B is broadcast along i.

Now let's introduce a j skew in k (here, k is the only time dimension that is available, as discussed below), with the following change of variables:

$$j' = j \quad \Leftrightarrow \quad j = j' \quad (2)$$
$$k' = k - j \qquad k = j + k'$$

This results in the following program:

Example 2 for i= . . . .
  for j= . . . .
    for k'= . . . (skewed bounds)

$C[i][j]+=A[i][k'+j]*B[k'+j][j];$ with Placement Pl=(i, j).

The placement space has not changed, but the reuse spaces have, as follows:

$R_C=\{i=0;j=0\}$ $R_A=\{i=0;k'+j=0\}$ $R_B=\{k'+j=0;j=0\}$

As a result, broadcast spaces have changed as well, as follows:

$B_C=\{0\}$ $B_A=\{0\}$ $B_B=\{j=0;k'=0\}$

None of A's elements is broadcast anymore in the resulting program. Another skewing, involving i, can similarly eliminate the broadcast of elements of B.

3 Methods

Now that we have described how to detect broadcasts and provided a motivation and framework for removing them, we will first look at how to compute broadcast-eliminating transformations for an example array reference (data structure reference, in general). Then, we will define heuristics for reducing broadcast in the case of multiple references, and even for the general case of imperfectly nested loops with an arbitrary number of statements. Our technique supports PE grids that are connected to their neighbors in arbitrary subsets of canonical directions.

3.1 General Method

The broadcast space, which is the intersection of the placement space and reuse space, has more than zero dimensions whenever the number of independent equalities from the placement space and the reuse space is less than the dimensions of the iteration space. There is a broadcast whenever the dimension of the broadcast space is non-zero.

The dimension of the broadcast space is given by n—rank (B), where n is the number of dimensions of the iteration space and B is a matrix formed by concatenating the normals to the hyperplanes defined by the equalities of the reuse and placement spaces. When the broadcast space has more than zero dimensions, we can reduce it when the normals to the placement space are not independent from the normals to the reuse space. Broadcast elimination reduces the dimensionality of the broadcast space by modifying the iteration space (through re-scheduling), such that either the placement space or the reuse space (or both) is modified. The broadcast space is reduced when the intersection of the resulting reuse and placement spaces is defined by more independent normals.

Thus, we want to turn one or more dependent normals into independent ones. By definition, the placement space spans the iterations used to represent space in a space-time mapping of iterations. Hence, the normals to the placement space depend upon time dimensions.

Based on the above, we reduce the dimension of the broadcast space by the following procedure:
1. Compute the iteration transformation space V of vectors independent from B (i.e., Ker(B)),
2. Iterate through the normals of the reuse space R
   (a) Each time a normal r is detected as dependent from the normals to P and the normals of R that were already visited in step 2, transform r into r'=r+v, where v is a non-zero vector in V.
   (b) Substitute r with r' in R The set of substitutions r'=r+v directly defines a transformation from the initial iteration space to a transformed iteration space, which reduces the broadcast space by as many dimensions as there were substitutions. The procedure described above can be repeated for each data structure that is accessed within a loop or a loop nest. As such, there is an iteration transformation space $V_{DS}$, a matrix $B_{DS}$, broadcast space $B_{DS}$, and reuse space $R_{DS}$ corresponding to each data structure DS. The placement space can be the same or different for different data structures but, in general, the placement space corresponds to the iterations of a particular statement and, as such, for all the data structures accessed from a particular statement, the placement space may be the same.

In the running example, we can remove the broadcast induced by accesses to A by forming $B_A$, as shown below. This transformation results in an modified code shown above in Example 2.

The computation of the reuse and broadcast spaces and the normals for Example 1 above is presented below. The computations involved the multiplication of two 2×2 matrices are:

$$C[1][1]=A[1][1]*B[1][1]+A[1][2]*B[2][1]$$

$$C[1][2]=A[1][1]*B[1][2]+A[1][2]*B[2][2]$$

$$C[2][1]=A[2][1]*B[1][1]+A[2][2]*B[1][2]$$

$$C[2][2]=A[2][1]*B[1][2]+A[2][2]*B[2][2]$$

The dimensions of the placement space are Pl=i, j. In the constraint form, the placement space is k=0, and the dimension normal to the placement space is k. Therefore, we have:

| Array | Reuse Space in Constraint Form | Broadcast Space as Intersection of the Reuse Space and Placement Space | Broadcast Dimension(s) |
|---|---|---|---|
| A | $R_A = i = 0$; $k = 0$ | $B_A = R_A \cap P = \{i = 0; k = 0\} \cap \{k = 0\} = i = 0; k = 0$ | j |
| B | $R_B = j = 0$; $k = 0$ | $B_B = R_B \cap P = \{j = 0; k = 0\} \cap \{k = 0\} = j = 0; k = 0$ | i |
| C | $R_C = i = 0$; $j = 0$ | $B_C = R_C \cap P = \{i = 0; j = 0\} \cap \{k = 0\} = \{i = 0; j = 0; k = 0\}$ | |

We also have:

| Array | Dimension(s) in which Values are Reused | Reuse Space in Constraint Form | Normal to Hyperplanes Defined by Equalities of Reuse Space | Concatenation of Normals | Broadcast Dimension(s) |
|---|---|---|---|---|---|
| A | j | $R_A = i = 0$; $k = 0$ | $NR_A = i, k$ | $B_A = i, k$ | j |
| B | i | $R_B = j = 0$; $k = 0$ | $NR_B = j, k$ | $B_B = j, k$ | i |
| C | k | $R_C = i = 0$; $j = 0$ | $NR_C = i, j$ | $B_C = i, j, k$ | |

The computation of the reuse and broadcast spaces and the normals for Example 1 above is presented below.

The dimensions of the placement space are Pl=i, j, in the constraint form, the placement space is k=0, and the dimension normal to the placement space is k. Therefore, we have:

| Array | Reuse Space in Constraint Form | Broadcast Space as Intersection of the Reuse Space and Placement Space | Broadcast Dimension(s) |
|---|---|---|---|
| A | $R_A = i = 0$; $k + j = 0$ | $B_A = R_A \cap P = \{i = 0; k + j = 0\} \cap \{k = 0\} = i = 0; j = 0; k = 0$ | |
| B | $R_B = j + k = 0$; $k = 0$ | $B_B = R_B \cap P = \{j + k = 0; k = 0\} \cap \{k = 0\} = j = 0; k = 0$ | i |
| C | $R_C = i = 0$; $j = 0$ | $B_C = R_C \cap P = \{i = 0; j = 0\} \cap \{k = 0\} = \{i = 0; j = 0; k = 0\}$ | |

We also have:

| Array | Dimension(s) in which Values are Reused | Reuse Space in Constraint Form | Normal to Hyperplanes Defined by Equalities of Reuse Space | Concatenation of Normals | Broadcast Dimension(s) |
|---|---|---|---|---|---|
| A | j | $R_A = i = 0$; $k + j = 0$ | $NR_A = i, j, k$ | i, j, k | |
| B | i | $R_B = j + k = 0$; $k = 0$ | $NR_B = j, k$ | j, k | i |
| C | k | $R_C = i = 0$; $j = 0$ | $NR_C = i, j$ | i, j, k | |

Computation of the two-step process above is shown below for Example 1.

Step (1):

| Data Structure | Broadcast Space | Matrix B | Space V | Corresponding Loop Dimension |
|---|---|---|---|---|
| A | $B_A = i, k$ | $B_A = [1\ 0\ 0; 0\ 0\ 1]$ | $V_A = [010]$ | j |
| B | $B_B = j, k$ | $B_B = [010; 001]$ | $V_B = [100]$ | i |
| C | $B_C =$ | Not computed | | |

Step 2(a):

Take the first normal from $NR_A=$, k i.e., i, represented as a vector i=[100]. It is independent from the normal to the placement space k=[001], so the process continues to the next normal.

Take the second normal from $NR_A$ {i, k} i.e., k, represented as a vector k=[0 0 1]. It is dependent from the normal to the placement space {k}=[0 0 1].

Step 2(b): We compute r'=r+v, where r is k, and v is a vector in the space defined by $V_A$. We can use {j}=[010], or {−j} [0-10], which are both vectors that belong to the space $V_A$. To match our running example, let us choose {−j}=[0-10]. The transformation is performed as:

$$[001] \times [i'j'k']^T = [001] \times [ijk]^T + [0 - 10] \times [ijk]^T$$

$$= [0 - 11] \times [ijk]^T$$

Thus, k'=−j+k, as shown in Example 2.

3.2 Desirable Properties for a Broadcast-Eliminating Transformation

A necessary property of the transformation is that it should be valid, i.e., that it preserves dependences. Otherwise, the semantics of the program as specified would change. However, we are considering broadcast elimination as a polyhedral optimization within a mapping process, i.e., a sequence of loop optimizations. Hence, a desirable broadcast-eliminating transformation should additionally try to preserve existing schedule properties as much as possible, in order to minimize the undoing of previous optimizations. In particular, scheduling of statements with respect to each other should be preserved, in order to preserve locality. More specifically, the fusion-fission structure of the schedule should remain intact, and the same schedule transformation should be applied to any common loops among statements.

The transformation should generally not introduce strides/steps, especially in the placement space, i.e., we want to create neighbor-to-neighbor reuse without hops, i.e., without skipping over interleaving processors, because this can increase inter-processor communication. For example, if processors P1 is a neighbor of processor P2 who is a neighbor of processor P3, but if processor P3 is not a neighbor of processor P1, scheduling the operations such that a communication from processor P1 to processor P3 is required may not be beneficial, because such a communication may need to pass through processor P2 which, itself, may not need, use, or generate the data elements passing therethrough. One way to reduce such artificial strides is to restrict transformations to be unimodular. This can maintain all iteration points on the original lattice of integer points. However, unimodularity may not be sufficient to obtain neighbor-to-neighbor communication patterns, as discussed below. Finally, a re-scheduling algorithm whose computational complexity can scale well with the number of statements and loop dimensions is preferred.

3.3 Validity

Broadcast elimination is a scheduling transformation, which means that it defines a transformation from the original iteration space of each statement to a new one. A general validity criterion is that the lexicographic sign of dependences is not modified by the transformation. For each pair (s, t) of statements linked by a dependence $D_{st}$, in which $D_{st} \Rightarrow I_s \leq I_t$, let $I'_s = \theta_s I_s$ (the schedule applied to the source statement s) and $I'_t = \theta_t I_t$ (the schedule applied to the target statement t). We need to preserve:

$$I'_s \leq I'_t \qquad (3)$$

Hence, a general search for a valid solution can be formulated as a series of Integer Linear Programs (ILPs), for each r' in the procedure described above in Section 3.1. However, ILPs do not present some of the important desirable properties of Section 3.2: unimodularity is a non-linear constraint, and ILPs don't scale well with the number of statements and loop dimensions. Note that preserving fusion-fission structure can be straightforward, as it means maintaining some dimensions of the schedule (often referred to as "beta dimensions"). In the next section, we define a strategy that can reduce the search space of scheduling transformations in a way that reduces broadcasts while meeting the desired properties of Section 3.2.

3.4 Unimodularity

One way to always build correct unimodular schedules is to make them a lower-triangular with "1" diagonal elements (which we will refer to as LTOD schedules). Having ±1 diagonal elements makes the schedule unimodular, while having positive diagonal elements preserves lexicographic sign, and hence ensures correctness (provided, as we mentioned earlier, that the beta coordinates are also unchanged). Hence, when forming schedules that have this form, no extra dependence checking is necessary. However, this is not powerful enough as it prevents us from reducing some broadcasts, as illustrated in the following example.

Example 3 for k= . . . .
   for i= . . . .
      for j= . . . .

C[i][j]+=A[i][k]*B[k][j];

with placement Pl=(i, j).

Broadcast in Example 3 is the same as in Example 1, which can be eliminated using the following schedule, which is not lower triangular.

$$\begin{pmatrix} 1 & -1 & -1 \\ 0 & 1 & 0 \\ 0 & 0 & 1 \end{pmatrix}$$

3.5 Minimal Per-Statement Distortion

In general, unimodular matrices can be defined as arbitrary combinations of elementary transformations:
1. permuting rows,
2. multiplying rows by −1, and
3. subtracting an integral multiple of a row from another.

Since we aim to stay as close as possible to original schedules, multiplying by −1 is generally unnecessary, as it would effect a loop inversion. The same is true for permuting rows, which would cause loop permutation.

Hence, we consider a composition of legal subtractions of a row (say the $p^{th}$ row) from another (say $q^{th}$ row), where p and q are different dimensions of a loop nest, which can each be written as:

$$1 - \alpha \delta_{pq} \qquad (4)$$

where 1 is the identity matrix, $\alpha$ an integer, and $$\delta_{pq}[x, y] = \begin{cases} 1 & \text{if} \{x = p, y = q\} \\ 0 & \text{otherwise} \end{cases} \qquad (5)$$

Since we want to minimize distortion from the existing schedule, and avoid the introduction of hops in the communication patterns, we force $\alpha = 1$. As a result, for any given statement, a broadcast-eliminating transformation can be fully defined by a set of distinct pairs p and q. We call p the "target" dimension.

3.6 Minimal Inter-Statement Distortion

Another way the original schedule properties can be significantly distorted is by defining conflicting schedule coefficients for pairs of statements that originally share the dimensions corresponding to these coefficients. Doing so can modify data locality significantly, and may affect parallelism properties including permutability.

At this stage, we may consider that eliminating broadcasts is more important than preserving data locality, or the opposite. In various embodiments, a variety of heuristics, for instance, based on cost functions and including brute-force search, may be applied to find an optimal trade-off between broadcast elimination and the preservation of other performance-related properties.

Some such heuristics are discussed below, with the assumption that we want to minimize the impact of the broadcast elimination transformation on the properties of the existing schedule. An important choice here is to produce consistent schedules. This means that for each pair (s, t) of statements that share a common beta (i.e., fusion-fission) coordinate at a given dimension k, the $k^{th}$ row of the schedule matrices $\theta_s$ and $\theta_t$ are the same. The fusion-fission structure of statements is conveniently represented in R-Stream™ compiler by their beta-tree, in which one node is defined per schedule dimension. Two statements share a schedule dimension at a loop dimension k if and only if their ancestor at level k in the beta-tree is the same node. Because fusing loop dimensions at level l>k is only possible when they are fused at level k, it can be seen that the structure of the beta nodes is a tree (hence the name beta-tree).

Note that finer trade-offs can be made between the need to maintain existing schedules and the need to perform broadcast elimination. In fact, maintaining consistent transformations can force the transformation of statements that do not have any broadcasts, where such transformation may be undesirable, as it may change the original schedule without minimizing broadcast. Since we attempt to preserve existing schedule properties, one way to address this situation is to decide whether to perform the (consistent) broadcast elimination or not, rather than producing inconsistent transformations.

For simplicity, in some embodiments, we assume that placement is consistent across statements, i.e., that the portion of placement functions involving the k common dimensions are the same for s and t. Some embodiments are generalized to placement that is inconsistent across placement functions by grouping statements by consistent placement functions.

Finally, the techniques presented herein work equally well on tiled or non-tiled code. For tiled code, the optimization pass we implemented is able to eliminate broadcast among inter-tile loop dimensions or intra-tile dimensions. An assumption here is that each dimension of placement functions is completely expressed in either the inter- or intra-tile dimensions, but not a mix of both. The decision to perform one or the other is based on properties of the machine model, which defines which processing level(s) of the architecture are spatial, i.e., have neighbor-to-neighbor communication capabilities.

3.7 Legal Unimodular Transformations

We have seen in Section 3.4 that LTOD schedules are always legal. Hence, we can check for the existence of an LTOD schedule. If it exists, it is legal. Similarly, we can look for a schedule (as in Section 3.9), and test if it is LTOD.

If no LTOD solution is found, we can take advantage of the fact that we are starting from an already placed program, to devise a scalable rescheduling algorithm. At a high level, parallelization is the process of mapping independent computations to different computing elements. In terms of dependences in a placed program, this means that for some $D_{st}$ dependences, we have $Pl(I_t)-Pl(I_s)=0$. By linearity of Pl, any linear combination P of the row vectors of the Pl matrix (which represent dimensions of the placement function) satisfies:

$$P_t I_t - P_s I_s = 0 \qquad (6)$$

As a result, we can add or subtract any P to an existing schedule without invalidating these dependences, since we have:

$$(P+\theta_t)I_t - (P+\theta_s)I_s = 0, (I_s, I_t) \in D_{st} \qquad (7)$$

In our running matrix multiplication example, all dependences respect Equation (6). Loop dimensions i, j and any linear combination of them can be subtracted from another iteration dimension to eliminate broadcasts in such a way that the transformation is unimodular, validates dependences, and introduces minimal strides.

In fact, the two transformations we use are:

$$\begin{pmatrix} 1 & 0 & 0 \\ 0 & 1 & 0 \\ -1 & 0 & 1 \end{pmatrix} \text{ and } \begin{pmatrix} 1 & 0 & 0 \\ 0 & 1 & 0 \\ 0 & -1 & 1 \end{pmatrix}$$

which compose as:

$$\begin{pmatrix} 1 & 0 & 0 \\ 0 & 1 & 0 \\ -1 & -1 & 1 \end{pmatrix}$$

However, not all dependences respect Equation (6). Outer schedule dimensions often validate some dependences, allowing inner schedule dimensions to expose parallelism among the remaining non-validated dependences.

Another class of dependences can be ignored: the one that are validated by the fusion-fission structure of the program (beta coordinates), which we are not modifying. Basically, at a given schedule dimension k, we can ignore dependences between statements that do not share the same node of the beta-tree at dimension k.

Now let us consider the remaining kind of dependences, which constrain the set of valid combinations of Pl. At a given schedule dimension k, we aim to find a schedule for all statements that have the same beta node at dimension k that validates the existing pairwise dependences. We are looking for consistent schedules, i.e., the schedule to find is the same for all these statements. The solution space is hence much more restricted than that of a traditional scheduling problem in which an independent schedule can be found for each statement. Because the schedule is the same for each statement under consideration, we can decompose the problem by dependence. Hence, we can find a per-dependence set of valid schedule using Farkas Lemma, and then find the needed schedule in the intersection of these valid schedule sets.

One additional aspect, which reduces the size of each per-dependence problem is that we are searching for the same schedule for the source and target statements. An extra-scalable but less powerful algorithm can be formulated, which abandons the search for P whenever it finds a dependence that is not already validated by the fusion-fission structure and that does not respect Equation (6). A remaining question is which loop dimensions the rows of Pl should be subtracted from, i.e., the target dimensions.

3.8 Time Dimensions

Let us define time dimensions as iteration space dimensions whose canonical vector is independent from the placement space. These are particularly interesting since they represent a multi-dimensional notion of time. Per the algorithm in Section 3.1, the schedules we are searching for will by definition be independent from the placement space. Hence, the schedules we are searching for will necessarily include time dimensions. Also, reuse occurs when a particular data set is accessed at different times, hence reuse spaces always involve time dimensions. We therefore want to modify time dimensions that are involved (as normals) in the reuse space, because they are the only loop dimensions through which we can modify the reuse space.

The significance of various time dimensions is not the same. Reuse along a time dimension means that the dataset touched by the loop dimensions inner to it may be reused.

Hence, it is important to consider locality of such a dataset with respect to the targeted PE memory. Specifically, if the reused data set needs to be evicted and reloaded into the targeted memory from one iteration of the considered time loop to the next, there is no advantage to eliminating broadcasts using the time loop, because it would still result in having a broadcast of the dataset between every PE in the original broadcast and the remote memory.

Hence, only the innermost relevant time dimension may be used to turn broadcasts into neighbor-to-neighbor communications. Tiling can be performed in a way that the dataset accessed by intra-tile dimensions is reused (or mostly reused within the tile). In this case, the target dimension can be uniquely defined as the innermost inter-tile time dimension. Otherwise, the optimal target dimension may be one that defines a dataset that is significantly reused from one iteration of the target dimension to the next.

By choosing time dimensions on a per statement basis, it is possible to define more than one time dimension within a group of statements which share (in the beta-tree) time dimensions. Each time dimension defines a broadcast-eliminating transformation, which needs to be applied to all the statements that share the time dimension in the beta-tree.

3.9 Algorithm

Since we aim to produce consistent schedules, the algorithm can directly work on the beta-tree. In summary, for statements that require broadcast elimination, we:
1. Select a time dimension. Such a dimension corresponds to a node in the beta-tree, which we call the statement's time node.
2. For each time dimension among the parent nodes of each statement in the beta-tree:
   (a) Define a legal linear combination of the rows of the placement function that is a combination of unimodular transformations as defined in Equation (4)
   (b) Apply the transformation consistently, i.e., to all the statements that share the time dimension in the beta-tree.

This process can be repeated until all the broadcasts that need to be eliminated and can be eliminated are eliminated.

Application of an embodiment of the Algorithm or matrix multiplication of Example 1 is described below.

The beta-tree is as follows:

[root]—[$i$]—[$j$]—[$k$]—statement1

Select a time dimension. From Section 3.8 above, a time dimension is a dimension whose canonical vector is independent from the placement space. We also use time dimensions that are involved in the reuse space, since according to Section 3.1 they are the ones that allow broadcast elimination. Here the only candidate is the loop dimension k, which corresponds to the [k] node in the beta-tree. The time dimension is the "target" dimension as introduced in section 3.5. It is the "p" in Equation (4).

The "for each" here has only one element, [k], and one statement. The linear combination can be formed by using Equation (4) with placement dimension i, combined with the schedule found by using Equation (4) with placement dimension j:

$$(100,010,-101) \times (100,010,0-11) = (100,010,-1-11)$$

Applying this schedule produces the following loop code:
for i= . . . .
    for j= . . . .
        for k'=(skewed bounds)
            $C[i][j] += A[i][k'+i+j] * B[k'+i+j][j]$ which does not have a broadcast.

Consider a variation of the matrix multiplication example, as follows:
for i= . . . .
    for j= . . . .

$C[i][j]=0$ //statement0 for k= . . . .

$C[i][j] += A[i][k] * B[k][j]$ //statement1

Here, the beta-tree is as follows:

[root]—[$i$]—[$j$]-+—statement0+—[$k$]—statement1

The only time dimension available is still [k]. Statement0 has no time dimension, but it also does not have a broadcast. Therefore, we do not transform it (in other words, its schedule is the identity matrix). Statement1 is the same as the only statement Example 1. We make the same choices as before:

$$(100,010,-101) \times (100,010,0-11) = (100,010,-1-11)$$

Applying this schedule gives us the following code:
for i= . . . .
    for j= . . . .

$C[i][j]=0$ for k'=(skewed bounds)

$C[i][j] += A[i][k'+i+j] * B[k'+i+j][j]$

In this transformed code, broadcast is eliminated.

3.10 Partially Spatial Architectures

We have implicitly assumed that all dimensions of the targeted architecture are spatial, i.e., a PE can communicate with its neighbors in all directions. However, some embodiments of the above-described algorithm can be straightforwardly extended to partially spatial architectures, in which such neighbor-to-neighbor communication is not available in all directions. In these embodiments, the algorithm is extended by only considering the placement functions that correspond to the spatial dimensions. It is also possible to restrict the removal of broadcasts to the ones that occur along the canonical directions of the PE grid, by performing consecutive broadcast eliminations based on each dimension of the placement function at a time.

4 Comparison to Systolic-Array Based Techniques

The problem of turning non-uniform communication patterns (including broadcasts) into neighbor-to-neighbor communications was addressed in systolic arrays, in which transfers were operated at a granularity of a processor cycle. Every time, some delay is introduced so as to pass one value to its neighboring computations.

The main technique for this based on polyhedral representations is called uniformization, which decomposes non-uniform dependences into a sum of uniform ones. If this process is adapted to turn broadcasts into neighbor-to-neighbor communications, unfortunately, the process serializes the execution of iterations along one dimension in order to obtain the uniform dependences and, hence, decreases the degree of parallelism in the program. In contrast, the process presented in various embodiments described herein does not decrease the amount of parallelism.

Variants of uniformization were also proposed in independent attempts to remove broadcasts as well as "computational broadcast," i.e., the redundant definition/computation of array elements across the systolic array. In the case of computational broadcasts, the code is converted to single-assignment, where only one PE defines the array element and passes it on to its neighbors.

Still in the context of systolic arrays, another technique considered a system of functional units linked by registers. Such a system can be represented by a graph, whose edge weights represent delays between pairwise functional units. Broadcasts can occur in this type of computation, so that technique describes retiming, a way to shift edge weights to modify the timing at which data originally broadcast is passed from functional unit to functional unit. Retiming can be applied along a depth-first spanning tree of the graph to remove broadcasts. These techniques, however, can adversely affect parallelization of the program and utilization of the processors, and are limited to systolic array architectures.

Some systolic-array-based techniques present a set of implementations of array computations on systolic networks. A mapping of matrix multiplication, LU decomposition, and triangular system solve are presented on a two-dimensional hexagonal network (FIG. 2), and matrix-vector multiplication is mapped to a 1-dimensional mesh. Some of the differences between the mappings obtained by these systolic-array based techniques and that obtained by various embodiments described herein, is discussed below.

First, the techniques presented herein provide a general basis for turning broadcasts into neighbor-to-neighbor communications. It is not specialized or limited to systolic arrays, and in particular, it does not incorporate constraints on the number of ports, or amount of data that can be transferred at each task iteration (i.e., each cycle, in the case of a systolic array), in any given direction. Different embodiments of the technique described herein do, however, incorporate such constraints.

A noteworthy difference is that various techniques described herein feature the production of unimodular transformations. The systolic-array based techniques, in contrast, seem to be based on non-unimodular placement of computations. Non-unimodularity has a direct, negative impact on the utilization of the PE grid. For instance, according to some systolic-array-based techniques, computations are placed on a lattice of determinant 2, resulting in only about half the PEs working at any given time. Various techniques described herein contrast with this in that the endeavor to produce unimodular transformations, which can maximize the PE grid utilization.

Moreover, all the mappings in a typical systolic array-based technique forces all data structures to flow through the interconnection network. As a result, they generally miss opportunities not to not transfer data that would not be broadcast anyway. For instance, in the above-described example of matrix multiplication, according to our technique, elements of C are computed entirely while a set of rows of A and columns of B pass through the PE grid. In certain systolic-array based techniques, however, each pass of the arrays A, B, and C only produces a partial summation of C, requiring that the result of such partial summation to be reinjected later into the systolic array, potentially creating more communications.

Finally, it should be understood that the discussion above highlights certain differences in the results produced by the techniques described herein and the results produced by various systolic-array based techniques. In terms of the manner in which these two kinds of techniques operate, there is no similarity whatsoever. In particular, systolic-array based techniques do not compute the reuse space and placement space, and do not manipulate these spaces to derive a broadcast space, where the broadcast space may be optimized using an iteration transformation space.

5 Topological Considerations

In this section, we discuss how various embodiments the presented technique may apply to various interconnection network topologies. We start with known non-hierarchical ones, and then discuss hierarchical parallel computing architectures.

5.1 Non-Hierarchical

The optimization according to various embodiments presented here may apply to a set of processors represented in an n-dimensional space, the placement function being n-dimensional, where n can be any number.

5.1.1 (n-d) Mesh

One straightforward realization of such a grid is obtained by bounding the processor coordinates along all the gird dimensions, so we get a n-dimensional mesh. Without the loss of generality, and also because it is a common practice, we assume that the lower bound on any processor grid coordinate is zero. The grid is low bounded, and it is represented as a hyper-rectangular polyhedron in the non-negative quadrant of the processor grid space (a zero lower bound and an upper bound corresponding to the number of processors in the grid along each dimension).

If the upper bound of a particular dimension is zero, the program cannot be parallelized across that dimension. Such a dimension may be ignored, so the processor grid becomes a (n−1)-dimensional grid. Other than this case, bounding does not affect various embodiments of our technique, i.e., the number of processors in each of the n dimensions can be any number. One or more (or all) dimensions may have the same number of processors or all the different dimensions may have different number of processors. Given a grid size $0 \leq G < S$, the n-dimensional placement function Pl(I) can be written as:

$$Pl'(I) = Pl(I) \bmod S \quad (8)$$

where the modulo (integer division remainder) operation is applied element-wise.

5.1.2 Torus

Let us take a closer look at the mesh placement function defined in Equation (8). One way to represent this mapping to a bounded processor grid is to represent it as a bijection:

$$Pl(I) = [Pl(I)/S] + Pl(I) \bmod S \quad (9)$$

which we can be represented by two new placement sets of dimensions, Pl' and Pl":

$$Pl(I) = Pl''(I) + Pl'(I) \quad (10)$$

Since the processor grid is bounded, Pl'(I) is the only part of Pl(I) to represent actual placement (i.e., processor coordinates). Hence Pl"(I) represents sequential(ized) loop iterations, i.e., they become time dimensions.

Let us assume that the program (also called code) is organized in tasks, i.e., a fixed number of outermost loops (called "inter-task loops") iterate across tasks, and the remaining inner loops ("intra-task loops") iterate within a task. Let us also assume that the placement function distributes tasks across the targeted processor grid. This is a general description of a parallelized loop nest, including when the loop nest is placed on a synchronous circuit (in which case the number of intra-task loops is zero). There is reuse of data across the edge of dimension k of a torus if and only if increasing the innermost inter-task loop can result in an increase of Pl"(I) by one along dimension k. Let D the iteration domain, d the dimension of the innermost inter-task loop, and let $1_d$ represent the canonical unit vector along dimension d. We consider the $k^{th}$ dimension $Pl(I)_k$ of the placement function Pl(I).

Given a program optimized with an embodiment of the overall technique described herein, which produces neighbor-to-neighbor reuses on an unbounded processor grid, we can formulate the above condition as an existence of an integer point in the following polyhedron:

$$\exists I, l \in E_k(I, \ l) = \begin{cases} I \in D \\ I + 1_d \in D \\ Pl(I)_k = S_k l + S_k - 1 \\ Pl(I + 1_d) = (S + 1)l \end{cases} \quad (11)$$

A simpler but less inclusive test informs us whether an increment of the innermost inter-task loop results in an increment along the $k^{th}$ placement dimension.

$$\{\forall I \in D | I + 1_d \in D : Pl(I + 1_d)_k - Pl(I)_k + 1\} \quad (12)$$

Equation (12) states is that if a value of I in the iteration domain is placed at the end of the $k^{th}$ dimension of the processor grid, and the next value along the innermost task loop dimension is placed at the beginning of that same dimension of the processor grid, the neighboring property is preserved along the (wrap-around) edge of the $k^{th}$ dimension of a toric mesh.

5.1.3 Hexagonal

The interconnection network connectivity available in traditional meshes goes along the canonical directions ("North-South-East-West" in the 2-dimensional case). We can express a family of regular n-dimensional interconnection networks that have a different connectivity by intersecting a processor grid of more than n dimensions with hyperplanes. Hyperplanes are represented by equalities in the polyhedron that defines the processor grid space.

Let us illustrate this with the two-dimensional hexagonal interconnect example (FIG. 2), which can be represented as the intersection of a three-dimensional grid with the hyperplane defined by:

$$Pl_0 - Pl_1 - Pl_2 = 0$$

Figure 2:
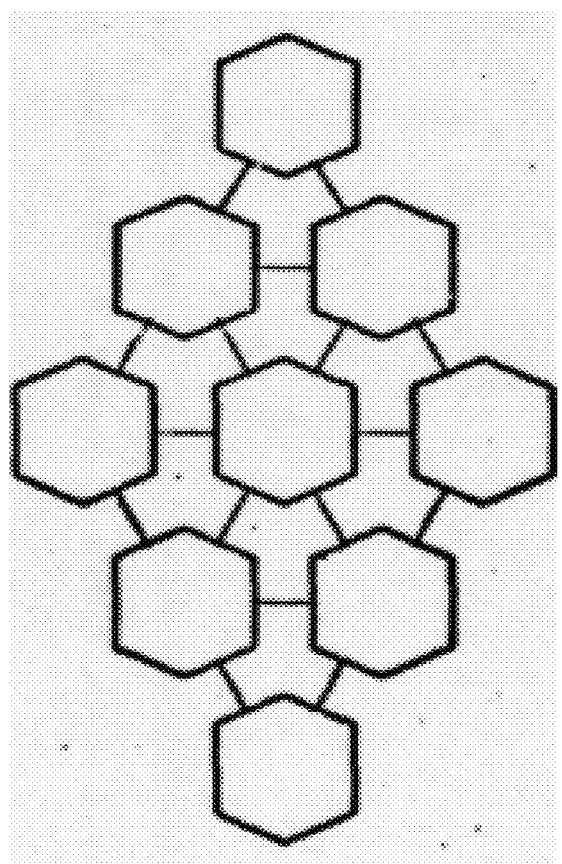
FIG. 2 schematically depicts a hexagonal processor interconnect.
Figure 3:
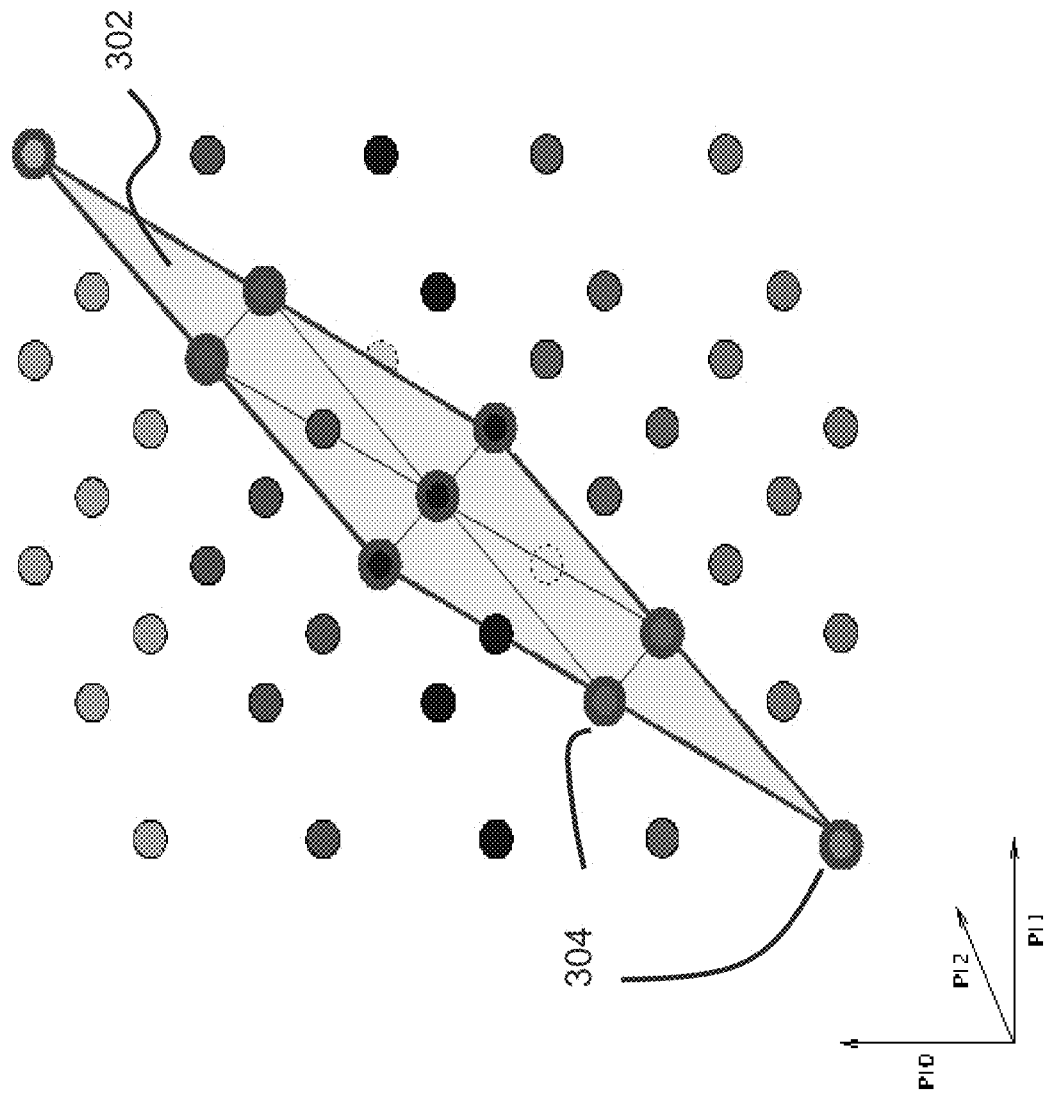
FIG. 3 schematically depicts a hexagonal processor interconnect represented as a subspace of a 3-dimensional processor grid.

The corresponding representation of the hexagonal interconnect of FIG. 2 is shown as a polyhedral processor grid space shown in FIG. 3. The intersection between the hyperplane and the grid is represented in light red at 302, while the points of the processor grid belonging to that hyperplane are circled in red 304.

On a mesh network, the definition of a neighbor is that the distance between processing element at coordinate $x \in N^n$ is neighboring processing element at coordinate $y \in N^n$ if and only if $\|x-y\| \leq 1$. On the hexagonal network represented in FIG. 3, the neighboring condition is instead $\|x-y\| \leq 2$. An octogonal two-dimensional interconnect can be represented by a two-dimensional grid associated with the neighboring condition $\|x-y\| \leq 2$. Note that the technique presented here does not focus on optimizing which neighbor-to-neighbor link should be used to perform the data transfer. That problem is left to a specific communication optimization pass of a polyhedral compiler.

5.2 Hierarchical

The way the presented broadcast elimination technique according to various embodiments best applies to computer architectures with hierarchical parallelism depends upon their communication capabilities. Let us consider, without the loss of generality, that there is an "outer" level of parallelism, represented by "outer" processing elements (PEs), which contain "inner" PEs. Examples of such architectures are plentiful, for instance: x86 multi-cores as outer, their SIMD (Single Instruction, Multiple Data) lanes as inner, or GPU (Graphics Processing Unit) accelerator cards as outer and their symmetric multiprocessor being inner.

5.2.1 Fine-Grain Inter-Outer-PE Communication

Figure 4:
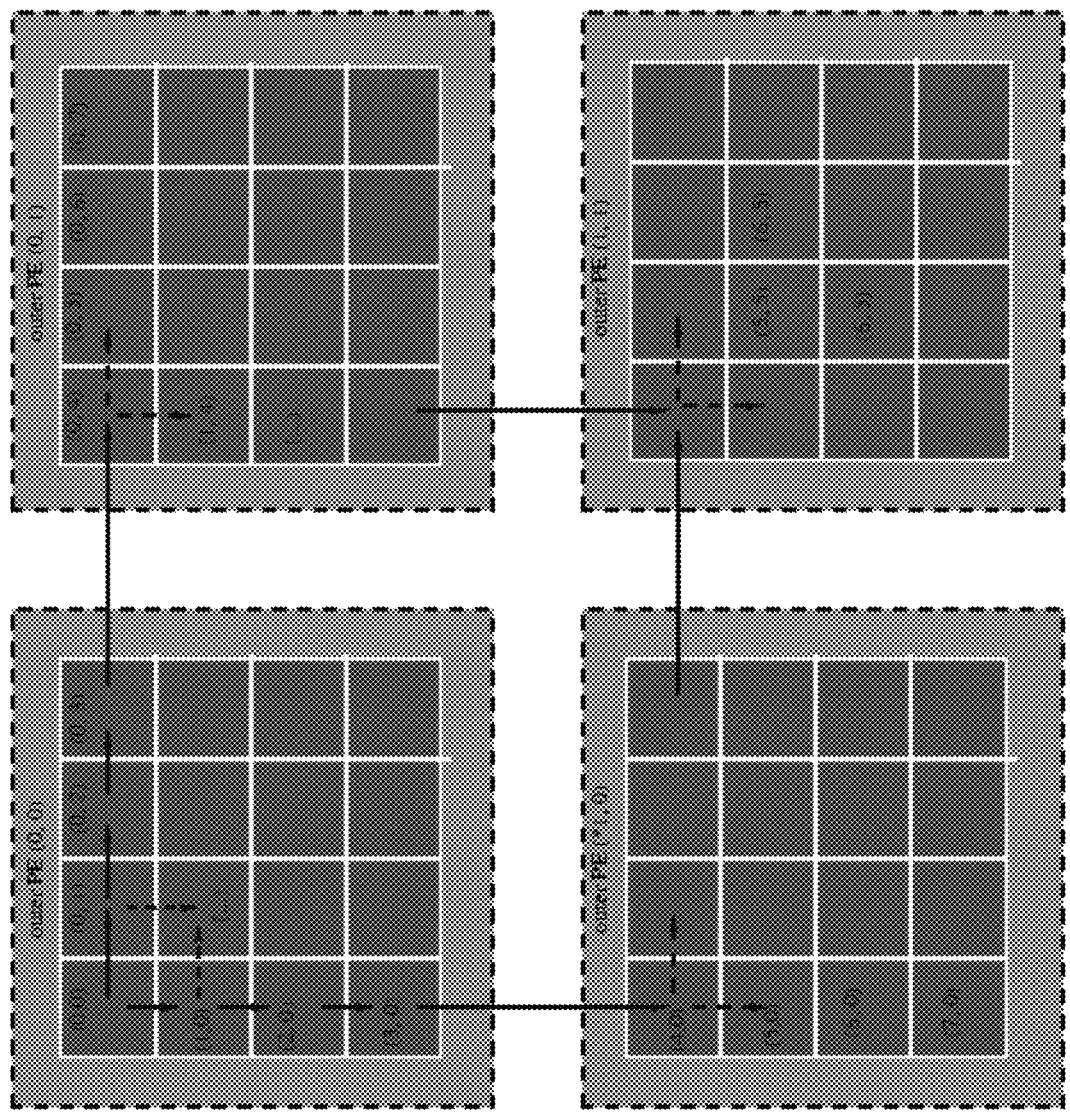
FIG. 4 schematically depicts a flattened view of a 2-dimensional PE grid with fine-grained inter-outer-PE capability.

Some architectures offer fine-grain communication among inner PEs of neighboring outer PEs, as illustrated in FIG. 4. We can view these as extending the spatial network that connects inner processing elements outside the boundaries of the outer PEs. These can be addressed as a "sea of inner processing elements," by flattening the placement function along the processor dimensions where such fine-grained communications are possible between outer PEs. Let us denote $Pl_k^o(I)$ any such outer-PE dimension, and $Pl_k^i(I)$ the corresponding inner-PE dimension. Also, let $S_k$ be the number of inner PEs along dimension k. Flattening is expressed by considering a new, one-dimensional placement function $Pl_k^f(I)$ defined as:

$$Pl_k^f(I) = S_k Pl_k^o(I) + Pl_k^i(I) \quad (13)$$

In some embodiments, our algorithm can then simply be applied to the flattened grid, in which the dimensions allowing fine-grained inter-outer-PE communications are flattened.

5.2.2 Coarse-Grain Inter-Outer-PE Communication

Another case is when inter-outer-PE communication is optimized for coarse grain. The techniques presented herein can still be used to eliminate broadcasts along any dimension of the outer and the inner grid. In this case, broadcast elimination at the outer PEs may result in the transfer of chunks of data that are reused between neighboring outer PEs at once. This may require fewer synchronization than the fine-grain case above, but can result in higher latency, since the receiving outer PE has to wait for more producer-side inner PEs to produce their output data before it can start feeding its own inner PEs.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A method for optimizing communication between a shared memory and a plurality of processors, the method comprising:

during compilation of a program to be executed using the plurality of processors, the program comprising a loop nest having a set of loop dimensions, and the loop nest comprising a first statement accessing a first data structure in iterations of the first statement, selecting by a computing unit the first data structure;

obtaining a placement space of the iterations of the first statement, across the plurality of processors, the placement space being defined in terms of one or more of the set of loop dimensions of the loop nest;

determining a reuse space of the first data structure across the iterations of the first statement, the reuse space being defined in terms of a subset of the set of loop dimensions; and deriving a broadcast space of the first data structure via an intersection of the placement space and the reuse space, wherein a non-empty broadcast space indicates that one or more elements of the first data structure are accessed by two or more of the plurality of processors, requiring communication of the one or more elements between a shared memory and each of the two or more processors.

2. The method of claim 1, further comprising:
determining that the broadcast space of the first data structure is empty, facilitating access to one or more elements of the first data structure by one processor from the plurality of processors directly from another processor from the plurality of processors, without accessing the shared memory.

3. The method of claim 1, wherein the reuse space of the first data structure is represented in a constraint form, and determining the reuse space comprises:
identifying a loop dimension wherein for different values of a loop index corresponding to the identified loop dimension, different elements of the first data structure are accessed; and
defining the reuse space, at least in part, by an equality setting the identified loop dimension to zero.

4. The method of claim 1, wherein the reuse space of the first data structure is represented in a constraint form, and determining the reuse space comprises:
from the set of loop dimensions, selecting a group of loop dimensions wherein, for each loop dimension in the group, accessing elements of the first data structure is independent of a loop index corresponding to that loop dimension; and
defining the reuse space as a set of equalities wherein, for each loop dimension in the set of loop dimensions that is not in the group of loop dimensions, the set of equalities comprises an equality setting that loop dimension to zero.

5. The method of claim 1, wherein the intersection of the placement space and the reuse space comprises a conjunction of: (i) one or more constraints representing the placement space and (ii) one or more constraints representing the reuse space.

6. The method of claim 1, wherein the intersection of the placement space and the reuse space comprises concatenation of: (i) one or more normals to one or more hyperplanes defined by one or more equalities of the reuse space and (ii) one or more normals to one or more hyperplanes defined by one or more equalities of the placement space.

7. The method of claim 1, wherein the broadcast space of the first data structure is defined as a set of constraint equalities setting one or more loop dimensions from the set of loop dimensions to zero, the method further comprising:
determining as a broadcast loop dimension of the first data structure, a loop dimension from the set of loop dimensions excluded from the one or more loop dimensions from the set of constraint equalities.

8. The method of claim 1, wherein the broadcast space of the first data structure is defined as a set of normals corresponding to one or more loop dimensions from the set of loop dimensions, the method further comprising:
determining as a broadcast loop dimension of the first data structure, a loop dimension from the set of loop dimensions excluded from the set of normals.

9. The method of claim 1, further comprising reducing a number of loop dimensions of the broadcast space of the first data structure for minimization of the communication of the one or more elements of the first data structure between the shared memory and each of the two or more processors, reducing the number of loop dimensions of the broadcast space comprising:
generating an iteration transformation space based on one or more loop dimensions from the set of loop dimensions that are independent of the broadcast space of the first data structure;
selecting a loop dimension corresponding to one or more normals to one or more hyperplanes defined by one or more equalities of the reuse space;
determining that the selected loop dimension is dependent from the placement space; and
modifying the selected loop dimension using a loop dimension from the iteration transformation space.

10. The method of claim 9, wherein the first statement or a second statement within the loop nest accesses a second data structure in iterations of the first or the second statement, the method further comprising:
performing the selecting, obtaining, determining, deriving, and the reducing step for the second data structure.

11. A system for optimizing communication between a shared memory and a plurality of processing elements (PEs), the system comprising:
a first processor; and
a first memory in electrical communication with the first processor, and comprising instructions that, when executed by a processing unit that comprises the first processor or a second processor, and that is in electronic communication with a memory module that comprises the first memory or a second memory, program the processing unit to:
during compilation of a program to be executed using the plurality of PEs, the program comprising a loop nest having a set of loop dimensions, and the loop nest comprising a first statement accessing a first data structure in iterations of the first statement, select the first data structure;
obtain a placement space of the iterations of the first statement, across the plurality of processors, the placement space being defined in terms of one or more of the set of loop dimensions of the loop nest;
determine a reuse space of the first data structure across the iterations of the first statement, the reuse space being defined in terms of a subset of the set of loop dimensions; and
derive a broadcast space of the first data structure via an intersection of the placement space and the reuse space, wherein a non-empty broadcast space indicates that one or more elements of the first data structure are accessed by two or more of the plurality of processors, requiring communication of the one or more elements between a shared memory and each of the two or more processors.

12. The system of claim 11, wherein the instructions further program the processing unit to:
determine that the broadcast space of the first data structure is empty, facilitating access to one or more elements of the first data structure by one PE from the plurality of PEs directly from another PE from the plurality of PEs, without accessing the shared memory.

13. The system of claim 11, wherein:
the reuse space of the first data structure is represented in a constraint form; and
to determine the reuse space, the instructions program the processing unit to:
identify a loop dimension wherein for different values of a loop index corresponding to the identified loop dimension, different elements of the first data structure are accessed; and
define the reuse space, at least in part, by an equality setting the identified loop dimension to zero.

14. The system of claim 11, wherein:
the reuse space of the first data structure is represented in a constraint form; and to determine the reuse space, the instructions program the processing unit to:
   select, from the set of loop dimensions, a group of loop dimensions wherein, for each loop dimension in the group, accessing elements of the first data structure is independent of a loop index corresponding to that loop dimension; and
   define the reuse space as a set of equalities wherein, for each loop dimension in the set of loop dimensions that is not in the group of loop dimensions, the set of equalities comprises an equality setting that loop dimension to zero.

15. The system of claim 11, wherein to perform the intersection of the placement space and the reuse space the instructions program the processing unit to compute a conjunction of: (i) one or more constraints representing the placement space and (ii) one or more constraints representing the reuse space.

16. The system of claim 11, wherein to perform the intersection of the placement space and the reuse space the instructions program the processing unit to compute concatenation of: (i) one or more normals to one or more hyperplanes defined by one or more equalities of the reuse space and (ii) one or more normals to one or more hyperplanes defined by one or more equalities of the placement space.

17. The system of claim 11, wherein:
   the broadcast space of the first data structure is defined as a set of constraint equalities setting one or more loop dimensions from the set of loop dimensions to zero; and
   the instructions further program the processing unit to:
      determine as a broadcast loop dimension of the first data structure, a loop dimension from the set of loop dimensions excluded from the one or more loop dimensions from the set of constraint equalities.

18. The system of claim 11, wherein:
   the broadcast space of the first data structure is defined as a set of normals corresponding to one or more loop dimensions from the set of loop dimensions; and
   the instructions further program the processing unit to:
      determine as a broadcast loop dimension of the first data structure, a loop dimension from the set of loop dimensions excluded from the set of normals.

19. The system of claim 11, wherein the instructions further program the processing unit to:
   reduce a number of loop dimensions of the broadcast space of the first data structure for minimization of the communication of the one or more elements of the first data structure between the shared memory and each of the two or more PEs,
   wherein, to reduce the number of loop dimensions of the broadcast space, the instructions program the processing unit to:
      generate an iteration transformation space based on one or more loop dimensions from the set of loop dimensions that are independent of the broadcast space of the first data structure;
      select a loop dimension corresponding to one or more normals to one or more hyperplanes defined by one or more equalities of the reuse space;
      determine that the selected loop dimension is dependent from the placement space; and
      modify the selected loop dimension using a loop dimension from the iteration transformation space.

20. The system of claim 19, wherein:
   the first statement or a second statement within the loop nest accesses a second data structure in iterations of the first or the second statement; and
   the instructions further program the processing unit to:
      perform the select, obtain, determine, derive, and the reduce operations for the second data structure.

* * * * *